United States Patent
Nowottny et al.

(10) Patent No.: US 11,148,961 B2
(45) Date of Patent: Oct. 19, 2021

(54) PROCESS FOR TREATMENT OF WASTEWATER

(71) Applicants: Heraeus Deutschland GmbH & Co. KG, Hanau (DE); Heraeus Precious Metal Technology (China) Co., Ltd., Jiangsu (CN); Heraeus Site Operations GmbH & Co. KG, Hanau (DE)

(72) Inventors: Christian Nowottny, Nidderau (DE); Birger Lehr, Nidderau (DE); Hartmut Janitz, Nidderau (DE); Zhenggang Yu, Nanjing (CN); Li Chen, Shanghai (CN)

(73) Assignees: HERAEUS DEUTSCHLAND GMBH & CO. KG, Hanau (DE); HERAEUS PRECIOUS METAL TECHNOLOGY (CHINA) CO., LTD., Jiangsu (CN); HERAEUS SITE OPERATIONS GMBH & CO. KG, Hanau (DE)

( * ) Notice: Subject to any disclaimer, the term of this patent is extended or adjusted under 35 U.S.C. 154(b) by 0 days.

(21) Appl. No.: 16/490,344

(22) PCT Filed: Mar. 9, 2017

(86) PCT No.: PCT/CN2017/076165
§ 371 (c)(1),
(2) Date: Aug. 30, 2019

(87) PCT Pub. No.: WO2017/084643
PCT Pub. Date: May 26, 2017

(65) Prior Publication Data
US 2020/0071197 A1  Mar. 5, 2020

(51) Int. Cl.
| | |
|---|---|
| C02F 1/00 | (2006.01) |
| C02F 1/66 | (2006.01) |
| C02F 101/20 | (2006.01) |
| C02F 1/56 | (2006.01) |
| C02F 1/64 | (2006.01) |
| C02F 1/42 | (2006.01) |
| C02F 103/16 | (2006.01) |

(52) U.S. Cl.
CPC ............... *C02F 1/42* (2013.01); *C02F 1/004* (2013.01); *C02F 1/56* (2013.01); *C02F 1/64* (2013.01); *C02F 1/66* (2013.01); *C02F 2001/425* (2013.01); *C02F 2101/203* (2013.01); *C02F 2103/16* (2013.01); *C02F 2301/08* (2013.01)

(58) Field of Classification Search
CPC ........ C02F 1/42; C02F 1/66; C02F 2001/425; C02F 2103/16
See application file for complete search history.

(56) References Cited

U.S. PATENT DOCUMENTS

| | | | |
|---|---|---|---|
| 2009/0173692 A1* | 7/2009 | Laraway | B01D 61/58 210/638 |
| 2012/0193296 A1 | 8/2012 | Bhaduri et al. | |
| 2014/0197029 A1* | 7/2014 | Sparrow | B01D 61/44 204/519 |
| 2015/0307965 A1* | 10/2015 | Boudreault | C01F 17/206 423/21.5 |
| 2015/0361524 A1* | 12/2015 | Sainio | B01D 15/362 423/139 |
| 2017/0114428 A1* | 4/2017 | Britton | C22B 11/04 |

FOREIGN PATENT DOCUMENTS

| | | |
|---|---|---|
| CN | 101935119 A | 1/2011 |
| CN | 106458673 A | 2/2017 |
| GB | 1153717 A | 5/1969 |
| WO | WO-2013088260 A1 | 6/2013 |

OTHER PUBLICATIONS

Leveque, Joceyln et al—CN 106458673 A Machine Translation—Feb. 2, 2017 (Year: 2017).*
International Search Report issued in PCT/CN2017/076165 dated Dec. 8, 2017.

* cited by examiner

*Primary Examiner* — Bradley R Spies
(74) *Attorney, Agent, or Firm* — Blank Rome LLP

(57) ABSTRACT

A process for the treatment of acidic wastewater which comprises hydrochloric acid, nitric acid as an optional component, 0.1 to 30 wt.-% of one or more dissolved metals selected from the group consisting of aluminum and heavy metals other than precious metals, and 10 to 500 wt.-ppm of at least one dissolved precious metal, wherein the process comprises the successive steps (1) to (5):
(1) adjusting the pH value of the wastewater to 6 to 8 to produce a first composition comprising a first precipitate and an aqueous phase having a pH value in the range of 6 to 8,
(2) adjusting the pH value of the first composition to >8 to 11 to produce a second composition comprising the first precipitate, a second precipitate and an aqueous phase having a pH value in the range of >8 to 11,
(3) separating the precipitates from the aqueous phase,
(4) passing the aqueous phase through a sand filter to produce an aqueous filtrate, and
(5) passing the aqueous filtrate through a regenerative cation exchanger comprising an acidic cation exchanger resin with chelating groups and a downstream non-regenerative cation scavenger comprising a scavenger resin with chelating sulfur containing groups to produce an aqueous salt solution with a total content of dissolved aluminum plus dissolved precious metals plus dissolved heavy metals other than precious metals of 0.1 to 10.0 wt.-ppm.

17 Claims, No Drawings

PROCESS FOR TREATMENT OF WASTEWATER

This application is a national stage of International Patent Application No. PCT/CN2017/076165, filed Mar. 9, 2017, the contents of which is incorporated herein by reference in its entirety.

The invention relates to a process for the treatment of wastewater.

In the following disclosure and in the claims the term "precious metals" is used. It means silver, gold, rhenium and the PGMs.

In the preceding paragraph, in the following disclosure and in the claims the abbreviation "PGMs" is used. It means the platinum group metals, i.e. the group of metals consisting of ruthenium, rhodium, palladium, osmium, iridium and platinum.

In the following disclosure and in the claims the term "heavy metals" is used. It means metals and metalloids having a density>5 $g/cm^3$. An example of such a metalloid is arsenic.

In the following disclosure and in the claims a distinction is made between precious metals and heavy metals other than precious metals.

There is a desire to develop an effective process for the purification of hydrochloric wastewater which comprises one or more dissolved precious metals and at least one other dissolved metal selected among aluminum and heavy metals other than precious metals. Desired goal of the process to be developed is to produce a purified wastewater with a pH value in the range of 6 to 10 or, in particular, 7 to 8.5, and with a strongly reduced total content of dissolved aluminum plus dissolved precious metals plus dissolved heavy metals other than precious metals in the range of 0.1 to 10.0 wt.-ppm (weight-ppm).

In this disclosure and in the claims the wording "total content of dissolved aluminum plus dissolved precious metals plus dissolved heavy metals other than precious metals in the range of 0.1 to 10.0 wt.-ppm" is used. This wording does and shall not exclude a possible presence of one or more individuals of said metals in an individual amount of <0.1 wt.-ppm, if desired, for example, because of statutory requirements.

It has been found that the aforementioned desired goal can be achieved by a process which the applicants have developed and which is disclosed in the following.

The invention relates to a process for the treatment of acidic wastewater which comprises hydrochloric acid, nitric acid as an optional component, 0.1 to 30 wt.-% (weight-%) of one or more dissolved metals selected from the group consisting of aluminum and heavy metals other than precious metals, and 10 to 500 wt.-ppm of at least one dissolved precious metal. The process comprises the successive steps (1) to (5):

(1) adjusting the pH value of the wastewater to 6 to 8 to produce a first composition comprising a first precipitate and an aqueous phase having a pH value in the range of 6 to 8,
(2) adjusting the pH value of the first composition to >8 to 11 to produce a second composition comprising the first precipitate, a second precipitate and an aqueous phase having a pH value in the range of >8 to 11,
(3) separating the precipitates from the aqueous phase,
(4) passing the aqueous phase through a sand filter to produce an aqueous filtrate, and
(5) passing the aqueous filtrate through a regenerative cation exchanger comprising an acidic cation exchanger resin with chelating groups and a downstream non-regenerative cation scavenger comprising a scavenger resin with chelating sulfur containing groups to produce an aqueous salt solution with a total content of dissolved aluminum plus dissolved precious metals plus dissolved heavy metals other than precious metals of 0.1 to 10.0 wt.-ppm.

In an embodiment, the acidic wastewater has a pH value in the range of 0 to <6. The wastewater comprises hydrochloric acid and, optionally, nitric acid. The acid or acids are present in a total amount which makes the wastewater acidic or, in an embodiment, to provide the wastewater with a pH value in the range of 0 to <6.

The wastewater comprises at least one dissolved metal selected from the group consisting of aluminum and heavy metals other than precious metals. In a particular embodiment, the heavy metals other than precious metals are selected from the group consisting of iron, copper, nickel, chromium, zinc, manganese, lead, arsenic, cadmium and mercury. The total amount of said at least one dissolved metal in the wastewater lies in the range of 0.1 to 30 wt.-% or, in an embodiment, in the range of 0.2 to 15 wt.-%. The one or more dissolved metals may be present in the wastewater in the form of cations and/or as central atoms of dissolved coordination complexes.

The wastewater comprises at least one dissolved precious metal. The total amount of said at least one dissolved precious metal lies in the range of 10 to 500 wt.-ppm. The one or more dissolved precious metals may be present in the wastewater in the form of cations and/or as central atoms of dissolved coordination complexes.

The wastewater may be a mixture or a combination of more than one different wastewaters, for example, from different wastewater streams. It is for example possible to combine two or more different wastewater streams. In case of a mixture or combination, it is possible that one or more individual wastewaters of such mixture or combination have a non-acidic pH value, as long as the mixture or combination has said acidic pH value.

The wastewater or the combined wastewaters may originate from a precious metal extraction process, such as, for example, the extraction of precious metals from precious metal ores, and/or it may originate from a precious metal recycling process, for example, a wet chemical precious metal recycling process, An example of a wet chemical precious metal recycling process is one in the course of which aqua regia is used.

In step (1) of the process of the invention the pH value of the acidic wastewater is adjusted to 6 to 8 to form a first composition comprising a first precipitate and an aqueous phase having a pH value in the range of 6 to 8.

The adjustment of the pH value, i.e. a pH increase, may be performed by mixing the acidic wastewater with one or more basic alkali compounds such as, for example, alkali carbonate and/or alkali hydroxide. Examples include in particular sodium hydroxide and/or potassium hydroxide. Alkali hydroxide is preferred, in particular in the form of an aqueous solution with a concentration in the range of, for example, 5 to 50 wt.-%. Optionally, one or more basic calcium compounds, such as, for example, calcium oxide, calcium hydroxide and/or calcium carbonate may be used in addition to the one or more basic alkali compounds, preferably alkali hydroxide.

The pH value increase to 6 to 8 results in the conversion of the wastewater into a first composition comprising a first precipitate and a first aqueous phase having a pH value in the range of 6 to 8. Said first composition may be a suspension in particular.

The pH adjustment and the first precipitation may be performed at ambient temperature. Step (1) may be supported by stirring or shaking.

In step (2) of the process of the invention the pH value of the first composition is adjusted to >8 to 11 to form a second composition comprising the first precipitate, a second precipitate and an aqueous phase having a pH value of >8 to 11.

The adjustment of the pH value, i.e. a pH increase, may be performed by mixing the first composition with one or more basic alkali compounds such as, for example, alkali carbonate and/or alkali hydroxide. Examples include in particular sodium hydroxide and/or potassium hydroxide. Alkali hydroxide is preferred, in particular in the form of an aqueous solution with a concentration in the range of, for example, 5 to 50 wt.-%. Optionally, one or more basic calcium compounds, such as, for example, calcium oxide, calcium hydroxide and/or calcium carbonate may be used in addition to the one or more basic alkali compounds, preferably alkali hydroxide.

The pH value increase to >8 to 11 results in the conversion of the first composition into a second composition comprising the first precipitate, a second precipitate and an aqueous phase having a pH value of >8 to 11. Said second composition may be a suspension in particular.

The pH adjustment and the second precipitation may be performed at ambient temperature. Step (2) may be supported by stirring or shaking.

In step (3) of the process of the invention the precipitates are separated from the aqueous phase having a pH value of >8 to 11. Such separation is a solid-liquid separation.

It may be expedient to support the solid-liquid separation of step (3) by adding a flocculent to the second composition. Examples of suitable flocculents comprise polyacrylamide and derivatives thereof. The flocculent may be added in an amount of, for example, 0.05 to 1 wt.-% relative to the second composition.

The separation of the precipitates and/or flocs, which may form kind of a sludge, may be performed by well-known conventional solid-liquid separation methods, such as, for example, sedimentation and/or decantation and/or filtration and/or centrifugation. It may be expedient to employ a filter screen or filter press for separating the precipitates and/or flocs.

The separation may be performed batchwise or as a continuous process.

In step (4) of the process of the invention the aqueous phase obtained in step (3) is passed through a conventional sand filter to remove fine particles which have not been completely separated in the course of the solid-liquid separation procedure of step (3). As a result of step (4) a clear aqueous filtrate is obtained.

In step (5) of the process of the invention the aqueous filtrate produced in step (4) is passed through a regenerative cation exchanger comprising an acidic cation exchanger resin with chelating groups and a downstream non-regenerative cation scavenger comprising a scavenger resin with chelating sulfur containing groups to produce an aqueous salt solution with a total content of dissolved aluminum plus dissolved precious metals plus dissolved heavy metals other than precious metals in the range of 0.1 to 10.0 wt.-ppm.

The regenerative cation exchanger comprises an acidic cation exchanger resin with chelating groups. The chelating groups comprise or are chelating iminodiacetate groups, in particular. Examples of such types of cation exchanger resins can be found among cationic exchanger resins of the Lewatit® TP type from Lanxess.

Once the aqueous filtrate has left the cation exchanger it passes through a non-regenerative cation scavenger which is arranged downstream of the cation exchanger. The non-regenerative cation scavenger comprises a scavenger resin with chelating sulfur containing groups. The chelating sulfur containing groups comprise or are chelating thiourea groups, in particular. Examples of such types of scavenger resins can be found among scavenger resins of the Lewatit® Monoplus TP type from Lanxess.

Step (5) does not comprise any methodological difficulties. Once the cation exchanger and the cation scavenger are exhausted, both need to be replaced by fresh ones. In case of the regenerative cation exchanger refreshing of its exhausted cation exchange resin can be performed by treating it with acid as is conventional. In case of the non-regenerative cation scavenger no refreshing procedure is available. The exhausted scavenger resin comprising the metal chelated by the sulfur containing groups may be subject to a conventional incineration procedure in the course of which the metals can be recovered from the incineration ash.

The aqueous salt solution leaving the cation scavenger as the conversion product of the aqueous filtrate produced in step (4) may represent a purified wastewater as explained above. It has a pH value in the range of 6 to 11, preferably in the range of 6 to 10 or even more preferred in the range of 7 to 8.5. It exhibits a strongly reduced total content of dissolved aluminum plus dissolved precious metals plus dissolved heavy metals other than precious metals in the range of 0.1 to 10.0 wt.-ppm. It comprises a salt content, which comprises as essential components: 1 to 15 wt.-% of alkali chloride, 0 to 5 wt.-% of calcium chloride and 0 to 5 wt.-% of alkali nitrate plus, optionally, calcium nitrate, wherein the wt.-% are in each case based on the aqueous salt solution.

If the pH value of the aqueous salt solution produced in process step (5) lies above 10 or above a target pH value in the range of 6 to 10 or, in particular, 7 to 8.5, the process of the invention comprises a further step (6) of adjusting the pH value to the target pH value. The pH adjustment may be performed by addition of a small amount of acid, in particular, hydrochloric acid, to the aqueous salt solution.

The peculiar combination of successive, in particular directly successive steps (1) to (5) or (1) to (6) is essential with regard to the successful performance of the process of the invention in terms of reaching the aforementioned goal to effectively produce a purified wastewater with a pH value in the range of 6 to 10 and with a total content of dissolved aluminum plus dissolved precious metals plus dissolved heavy metals other than precious metals in the range of 0.1 to 10.0 wt.-ppm.

The aqueous salt solution produced in step (5) or (6) may be discharged in accordance with statutory regulations. Otherwise, in case statutory regulations do not allow a simple discharge, i.e. if statutory regulations require a zero liquid discharge (ZLD), for example because of restrictions related to the salt content or components thereof, the aqueous salt solution can be dried in a step (7) to evaporate the water and produce a salt residue mainly composed of alkali chloride. Such salt residue may be used as deicing salt, provided it is free of nitrate or a nitrate content thereof is sufficiently low in accordance with statutory regulations. If the nitrate content is too high, the salt residue may be deposited as hazardous waste in accordance with statutory regulations.

The invention claimed is:

1. A process for the treatment of acidic wastewater which comprises hydrochloric acid, 0.1 to 30 wt.-% of one or more dissolved metals selected from the group consisting of aluminum and heavy metals other than precious metals, and 10 to 500 wt.-ppm of at least one dissolved precious metal, wherein the process comprises the successive steps (1) to (5):

(1) adjusting the pH value of the wastewater to 6 to 8 to produce a first composition comprising a first precipitate and an aqueous phase having a pH value in the range of 6 to 8, (2) adjusting the pH value of the first composition to >8 to 11 to produce a second composition comprising the first precipitate, a second precipitate and an aqueous phase having a pH value in the range of >8 to 11, (3) separating the precipitates from the aqueous phase, (4) passing the aqueous phase through a sand filter to produce an aqueous filtrate, and (5) passing the aqueous filtrate through a regenerative cation exchanger comprising an acidic cation exchanger resin with chelating groups followed by a downstream non-regenerative cation scavenger comprising a scavenger resin with chelating sulfur containing groups to produce an aqueous salt solution with a total content of dissolved aluminum plus dissolved precious metals plus dissolved heavy metals other than precious metals of 0.1 to 10.0 wt.-ppm, wherein the aqueous salt solution comprises a salt content which comprises as essential components: 1 to 15 wt.-% of alkali chloride, 0 to 5 wt.-% of calcium chloride and 0 to 5 wt.-% of alkali nitrate, wherein the wt.-% are in each case based on the aqueous salt solution.

2. The process of claim 1, wherein the acidic wastewater has a pH value in the range of 0 to <6.

3. The process of claim 1, wherein the wastewater is a mixture or a combination of more than one different wastewaters.

4. The process of claim 1, wherein the wastewater originates from a precious metal extraction process and/or from a precious metal recycling process.

5. The process of claim 1, wherein the adjustment of the pH value of step (1) is performed by mixing the acidic wastewater with one or more basic alkali compounds.

6. The process of claim 1, wherein the adjustment of the pH value of step (2) is performed by mixing the first composition with one or more basic alkali compounds.

7. The process of claim 1, wherein the solid-liquid separation of step (3) is supported by adding a flocculent to the second composition.

8. The process of claim 7, wherein the flocculent comprises polyacrylamide and/or one or more derivatives thereof.

9. The process of claim 1, wherein the separation of step (3) is performed batchwise or as a continuous process.

10. The process of claim 1, wherein the chelating groups of the acidic cation exchanger resin comprise chelating iminodiacetate groups.

11. The process of claim 1, wherein the chelating sulfur containing groups of the scavenger resin comprise chelating thiourea groups.

12. The process of claim 1, further comprising a step (6) of pH adjustment of the aqueous salt solution to a pH value in the range of 6 to 10.

13. The process of claim 12, further comprising a step (7) of drying the aqueous salt solution produced in step (5) or (6).

14. The process of claim 1, further comprising a step (6) of drying the aqueous salt solution produced in step (5).

15. The process of claim 1, wherein the aqueous salt solution further comprises calcium nitrate.

16. The process of claim 1, wherein the acidic wastewater further comprises nitric acid.

17. The process of claim 10, wherein the chelating sulfur containing groups of the scavenger resin comprise chelating thiourea groups.

* * * * *